United States Patent [19]

Shindo

[11] Patent Number: 5,592,460
[45] Date of Patent: Jan. 7, 1997

[54] LOW PROFILE OPTICAL PICKUP UNIT FOR RECORDING/REPRODUCING DEVICE

[75] Inventor: Hiroyuki Shindo, Chofu, Japan

[73] Assignee: Teac Corporation, Tokyo, Japan

[21] Appl. No.: 502,885

[22] Filed: Jul. 17, 1995

[30] Foreign Application Priority Data

Jul. 21, 1994 [JP] Japan .................... 6-169741

[51] Int. Cl.$^6$ ........................................ G11B 7/00
[52] U.S. Cl. ........................ 369/112; 369/118; 369/120
[58] Field of Search ......................... 369/112, 44.23, 369/44.24, 44.15, 44.12, 120, 118

[56] References Cited

U.S. PATENT DOCUMENTS

| | | | |
|---|---|---|---|
| 5,005,162 | 4/1991 | Mitsumori et al. | 369/112 |
| 5,223,970 | 6/1993 | Oono et al. | 369/112 |
| 5,237,557 | 8/1993 | Kasahara et al. | 369/112 |
| 5,283,771 | 2/1994 | Kadowaki et al. | 369/112 |

FOREIGN PATENT DOCUMENTS 3-189932 8/1991 Japan .
5-120723 5/1993 Japan .

Primary Examiner—Nabil Hindi
Attorney, Agent, or Firm—Ladas & Parry

[57] ABSTRACT

A light emitting unit emits light beams in a direction downwardly oblique from a horizontal direction and a stand-up mirror reflects the light beams so as to deflect them upward. An objective lens converges deflected light beams onto an information recording medium. A lens holder holds the objective lens, and an aperture stop is provided in the lens holder to limit light beams which are then incident on the objective lens. The aperture stop is located higher than a projecting end of a bottom convex surface of the objective lens. A top end of the light emitting unit is located higher than a projecting end of a top convex surface of the objective lens. The lens holder has a shape such that the lens holder may not enter a light path along which the light beams emitted by the light emitting unit and then incident on the stand-up mirror pass. A portion, of the stand-up mirror, which extends lower than a bottom end of mirror surface of the stand-up mirror may be removed from the stand-up mirror.

8 Claims, 9 Drawing Sheets

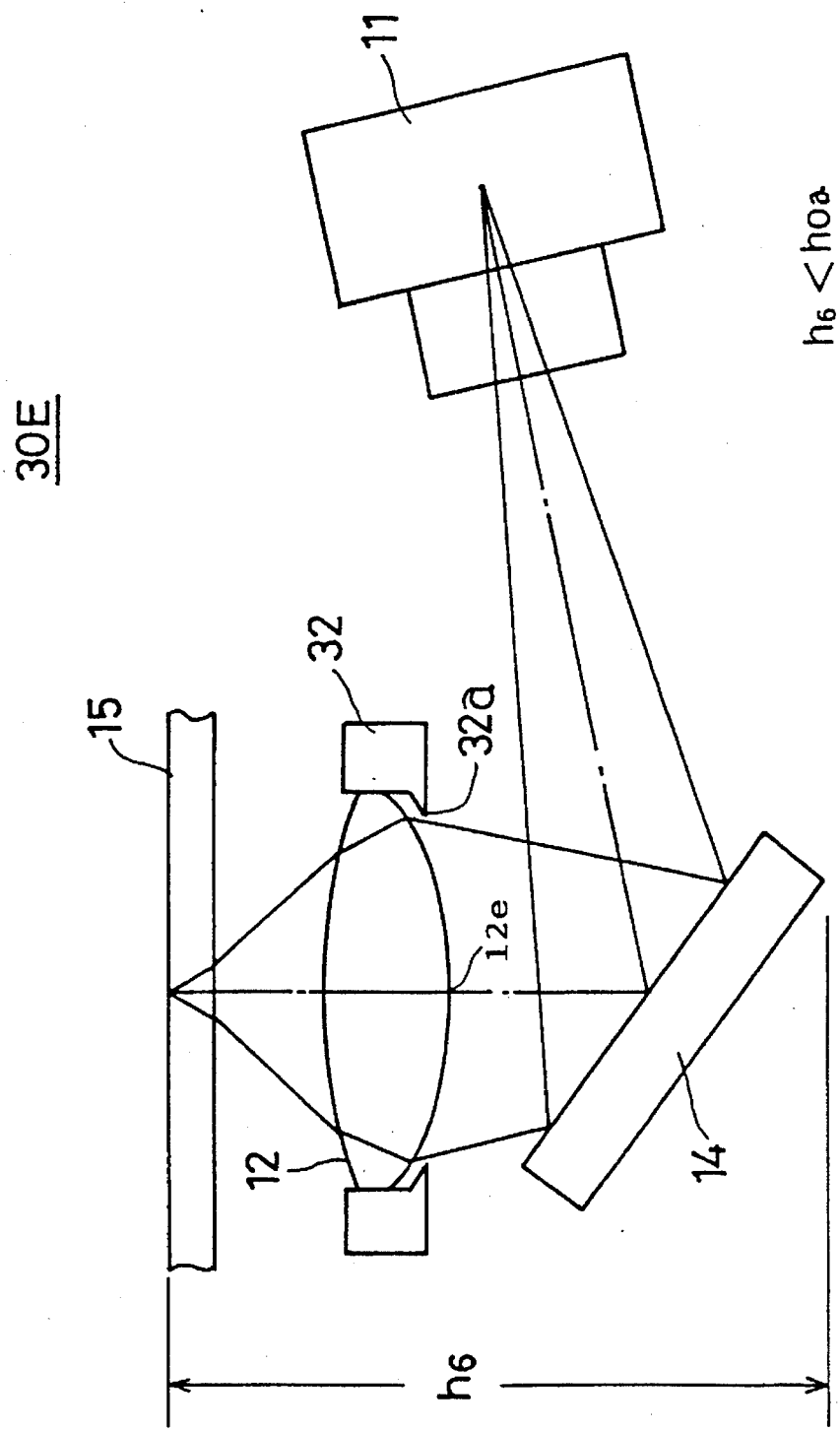

5,592,460

LOW PROFILE OPTICAL PICKUP UNIT FOR RECORDING/REPRODUCING DEVICE

This application claims priority from Japanese Patent Application 6-169741 filed Jul. 21, 1994. Said document is incorporated herein by reference.

BACKGROUND OF THE INVENTION

1. Field of the Invention

The present invention relates to an optical pickup device, in particular, an optical pickup device used in an optical disc device for optically recording and reproducing information.

Recently, the optical disc device has been made thinner, i.e., have reduced height. In response to this tendency, it is required to made the optical pickup device thinner or of less height.

2. Description of Related Art

FIG. 1 shows an optical pickup device 10 of the related art. The optical pickup device has an arrangement effective for thinning the device. For this purpose, a light emitting unit 11 is provided in which a semiconductor laser, a light detector, a diffraction grating, and a hologram element for performing deflection and light dividing functions are integrated (not shown in the figure). Further, a limited-distance objective lens 12 is provided so as to eliminate use of a collimator lens. A height $h_0$ of the optical pickup device 10 is the distance between a bottom or lower end of the light emitting unit 11 and a label surface (the top surface) of an optical disc 15 as show in the figure. Further, in the figure, directions $D_1$ and $D_2$ indicate the directions of movement of the objective lens 12 during a focusing control operation and thus an image point 18, relative to an object point 17, is positioned on the label surface of the disc 15. A level Hc indicates the neutral position in the objective lens 12.

Three light beams 13 emitted from the light emitting unit 11 are reflected by a stand-up mirror 14 and, thus, are vertically deflected. The stand-up mirror has a stand-up angle $\phi_0$ set to be 45 degrees. The deflected light beams 13 are then converged by the objective lens 12 and thus three minute spots (not shown in the figure) are projected onto a recording surface 15a of the disc 15. The light beams are then reflected by the recording surface 15a of the disc 15. Resulting reflected beams 18 are returned to the light emitting unit 11 via the objective lens 12 and the stand-up mirror 14.

The returned light beams are guided to the light detector (not shown in the figure) and then a focus error signal, a tracking error signal and a reproduced signal are obtained. The focus error signal is used in driving an actuator (not shown in the figure) and thus the objective lens 12 is moved vertically (along the $D_1/D_2$ directions) in the focusing control operation. Thus, a focus error of the light beams on the recording surface 15a of the disc 15 is eliminated. The tracking error signal is used in driving another actuator (not shown in the figure) and thus the objective lens is moved horizontally. Thus, tracking error of the light beams on the recording surface 15a of the disc 15 is eliminated.

FIG. 2 shows another optical pickup device 20 in the related art. Reference numerals which are the same as those of components shown in FIG. 1 are used for corresponding components shown in FIG. 2. The optical pickup device 20 is disclosed in Japanese Laid-Open Patent Application No. 3-189932 and Japanese Laid-Open Patent Application No. 5-120723.

In the optical pickup device 20, the stand-up mirror 14 has a stand-up angle $\phi_{1a}$ set to a value smaller than the above-mentioned stand-up angle $\phi_0$ of 45 degrees shown in FIG. 1, for example, 40 degrees. As the stand-up angle $\phi_{1a}$ becomes smaller value, the light emitting unit 11 can be raised as show in FIG. 2 and also a height $_{a0a}$ of the standing mirror 14 decreased from the height $a_0$ shown in FIG. 1. As a result, the bottom end of the light emitting unit 11 is higher than the bottom end of the standing mirror 14 as shown in the figure. Therefore, the height $h_{0a}$ of the optical pickup device 20 is lower than the height $h_0$ of the optical pickup device 10 shown in FIG. 1. In other words, the optical pickup device 20 is thinner, i.e., is of less height, than the optical pickup device 10.

A relationship of the stand-up angle $\phi_{1a}$ of the stand-up mirror 14 and an angle $\phi_{2a}$ by which the light beams are deflected is indicated by an equation $\phi_{2a}=2\phi_{1a}$. Accordingly, in order for the light beams reflected by the stand-up mirror 14 to have the stand-up angle smaller than 45 degrees and be precisely vertically deflected, the light emitting unit 11 is inclined as shown in FIG. 2. Thus, a light axis 11a of the light emitting unit 11 is downward inclined at an angle $\phi_{3a}$ from the horizontal direction.

An objective-lens holder 21 encircles the objective lens 12 and thus provides support. The objective-lens holder 21 has an aperture stop 21a at the bottom end thereof for limiting light beams which are reflected by the stand-up mirror 14 and then incident on the objective lens 12. The limited-distance objective lens 12 has a convex top surface 12a and a convex bottom surface 12b. The convex top surface 12a has a top portion 12c thereon at a position at which the light axis of the objective lens 12 crosses the convex top surface 12a. The top portion 12c is located at a level $H_1$ as show in the figure. The convex bottom surface 12b has a bottom portion 12e thereon at a position at which the light axis of the objective lens 12 crosses the convex bottom surface 12b. The bottom portion 12e is located at a level $H_2$ as show in the figure.

In the optical pickup device 20, the aperture stop 21a of the objective-lens holder 21 is located lower level than the level $H_2$ of the bottom portion 12e of the objective lens 12. The light emitting unit 11 is positioned at a level $H_3$, and the top end 11a of the light emitting unit 11 is located lower than the level $H_1$ of the top portion 12c.

Considering that a very thin optical disc device will be incorporated in a notebook-type personal computer, further thinning or height reduction of the optical pickup device 20 shown in FIG. 2 is required. For this purpose, it can be considered that the position of the stand-up mirror 14 is further raised and/or the stand-up angle $\phi_{1a}$ is further reduced. In order to make clear problems which may occur as a result of such modifications being performed, for example, FIG. 3 shows an arrangement resulting from performing the modifications on the device shown in FIG. 2. In FIG. 3, 'Mr' indicates a movement range of the holder 21.

As shown in FIG. 3, the height of the optical pickup device is reduced to a height $h_{0aa}$ as show in the figure, and thus the device is of reduced height. However, when the objective lens 12 is moved downward in the focusing control operation, a part of the light beams 13 is blocked by the bottom end of the objective-lens holder 21. Thus, a partial eclipse occurs and thus information reproduction from the optical disc 15 may not be properly performed.

SUMMARY OF THE INVENTION

An object of the present invention is to provide an optical pickup device in which the above-mentioned problems can be eliminated.

Therefore, an optical pickup unit is provided which comprises:

a light emitting unit for emitting light beams in a direction downwardly oblique from a horizontal direction;

a stand-up mirror for reflecting the light beams so as to deflect the light beams upwardly;

an objective lens for converging deflected light beams on an information recording medium; and a lens holder for holding the objective lens;

an aperture stop is provided in the lens holder for limiting light beams which are then incident on the objective lens;

the aperture stop is located higher than a projecting end of a bottom convex surface of the objective lens.

It is preferable that:

a top end of the light emitting unit is located higher than a projecting end of a top convex surface of the objective lens; and the lens holder has a shape such that it may not enter a light path along which the light beams emitted by the light emitting unit and then incident on the stand-up mirror pass.

Another optical pickup unit, according to the present invention includes:

a light emitting unit for emitting light beams in a direction downwardly oblique from a horizontal direction;

a stand-up mirror reflects the light beams so as to deflect the light beams upwardly;

an objective lens converges deflected light beams on an information recording medium; and a lens holder holds the objective lens;

an aperture stop is provided in the lens holder for limiting light beams which are then incident on the objective lens;

a top end of the light emitting unit is located higher than a projecting end of a top convex surface of the objective lens; and the lens holder has a shape such that it may not enter a light path along which the light beams emitted by the light emitting unit and then incident on the stand-up mirror pass.

Another optical pickup unit, according to the present invention, comprises:

a light emitting unit for emitting light beams in a direction downwardly oblique from a horizontal direction;

a stand-up mirror reflects the light beams so as to deflect the light beams upwardly;

an objective lens converges deflected light beams on a information recording medium; and a lens holder is provided for holding the objective lens;

an aperture stop is provided in the lens holder for limiting light beams which are then incident on the objective lens;

a portion, of the stand-up mirror, which extends lower than a bottom end of mirror surface of the stand-up mirror being removed from the stand-up mirror.

Other objects and further features of the present invention will become more apparent from the following detailed description when read in conjunction with the accompanying drawings.

BRIEF DESCRIPTION OF THE DRAWINGS

FIG. 9 shows an arrangement of the optical pickup device in a sixth embodiment of the present invention.

DESCRIPTION OF THE PREFERRED EMBODIMENTS

Figure 1:
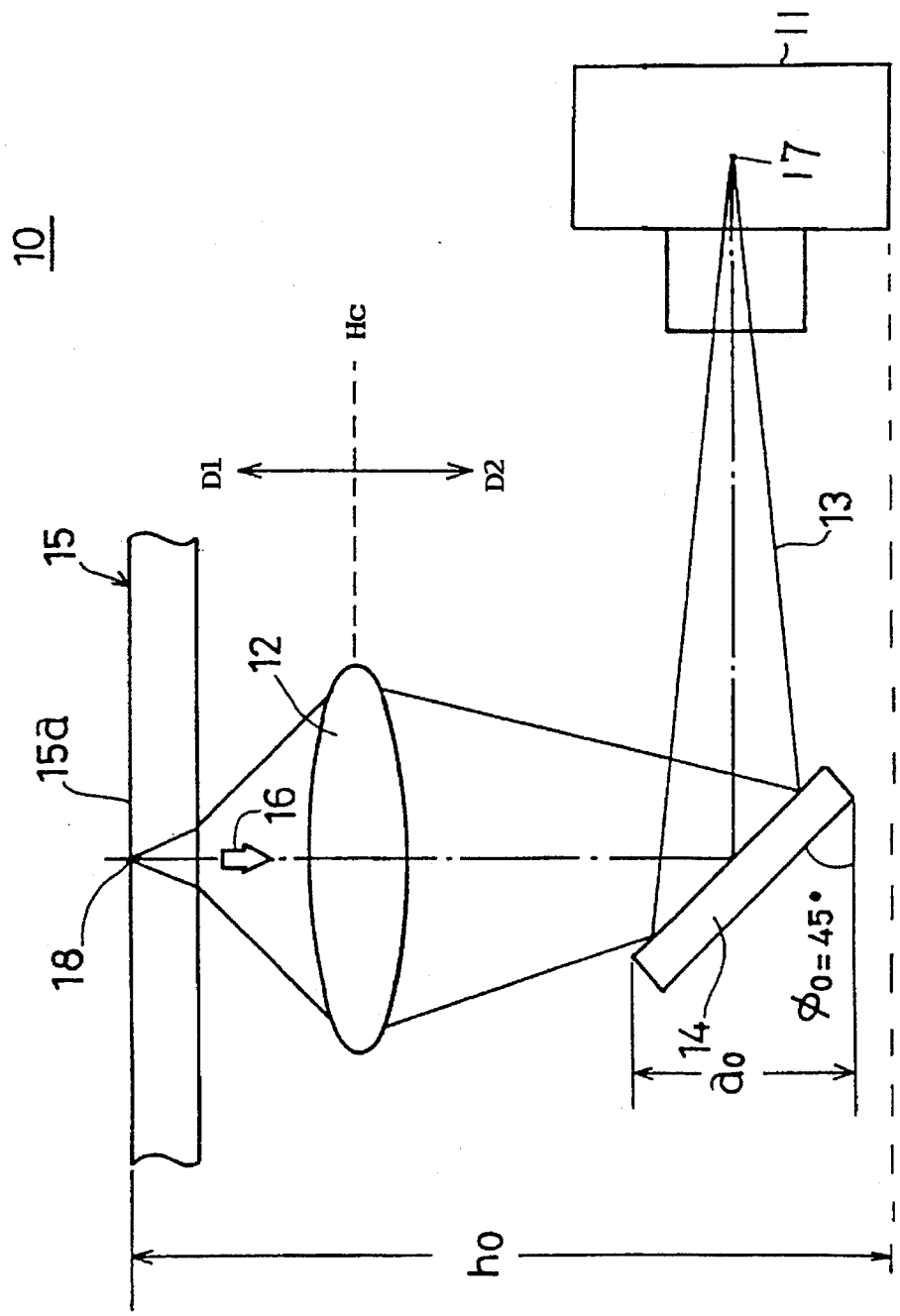
FIG. 1 shows an arrangement of an optical pickup device in the related art.
Figure 2:
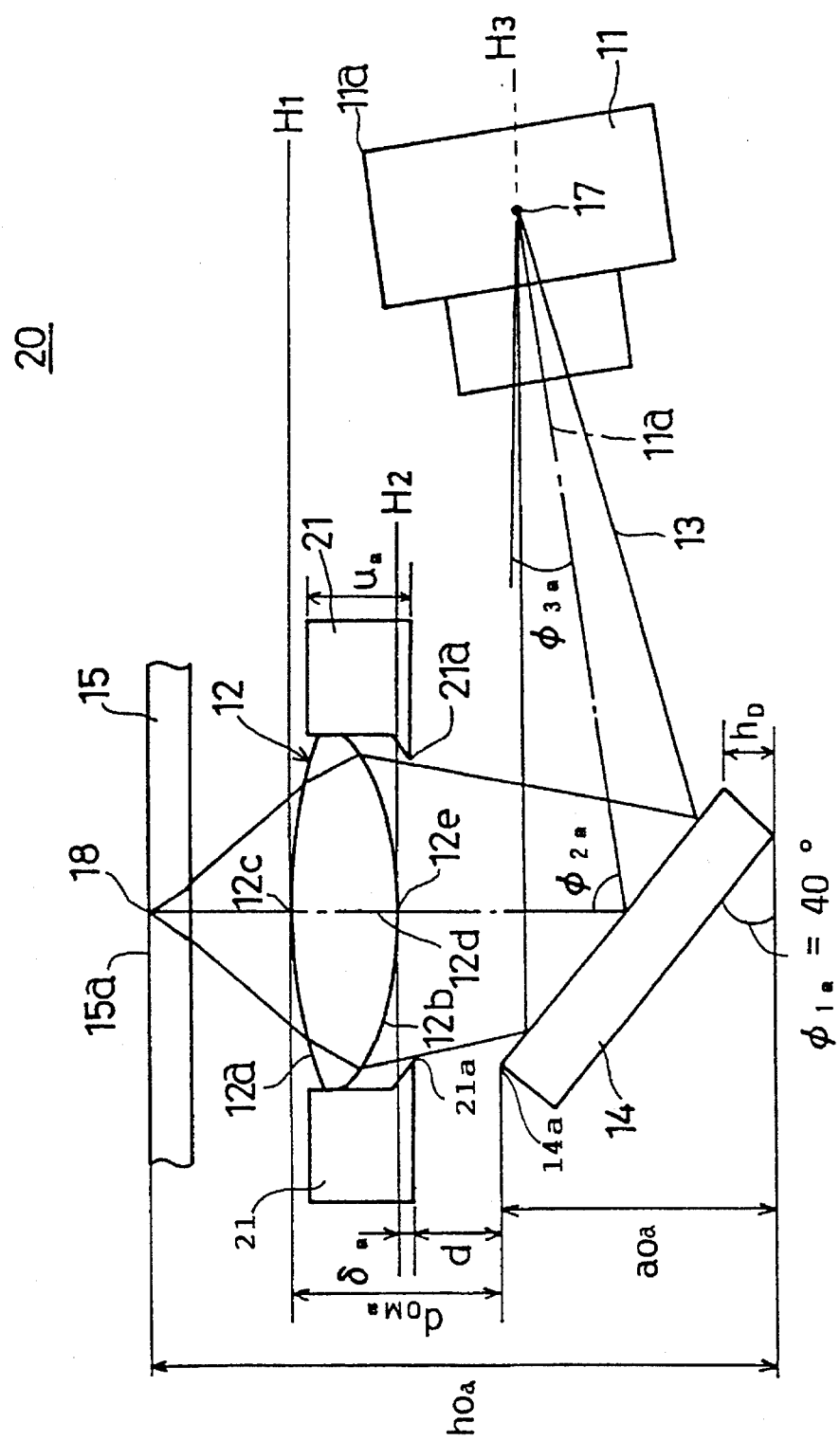
FIG. 2 shows an arrangement of the other optical pickup device in the related art.
Figure 3:
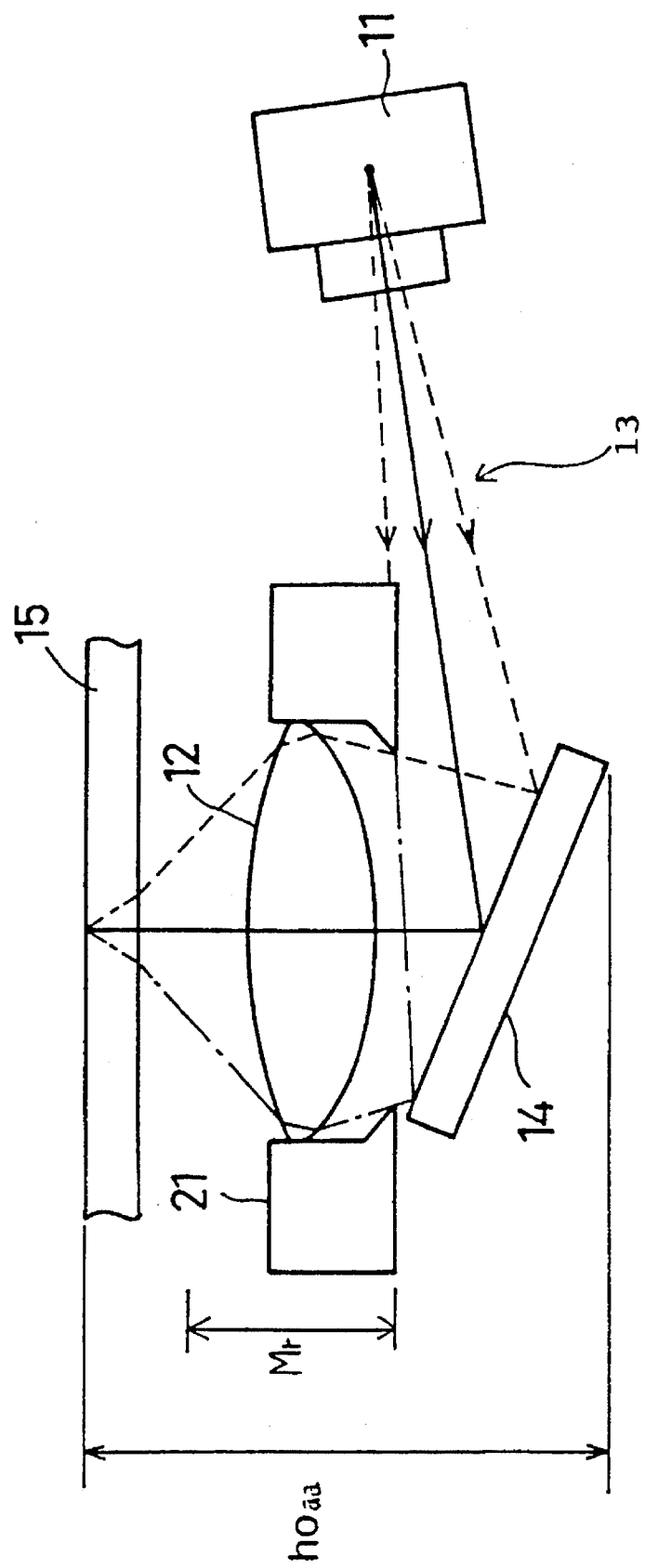
FIG. 3 shows an arrangement of the optical pickup device which illustrates problems which may occur in the related art.
Figure 4:
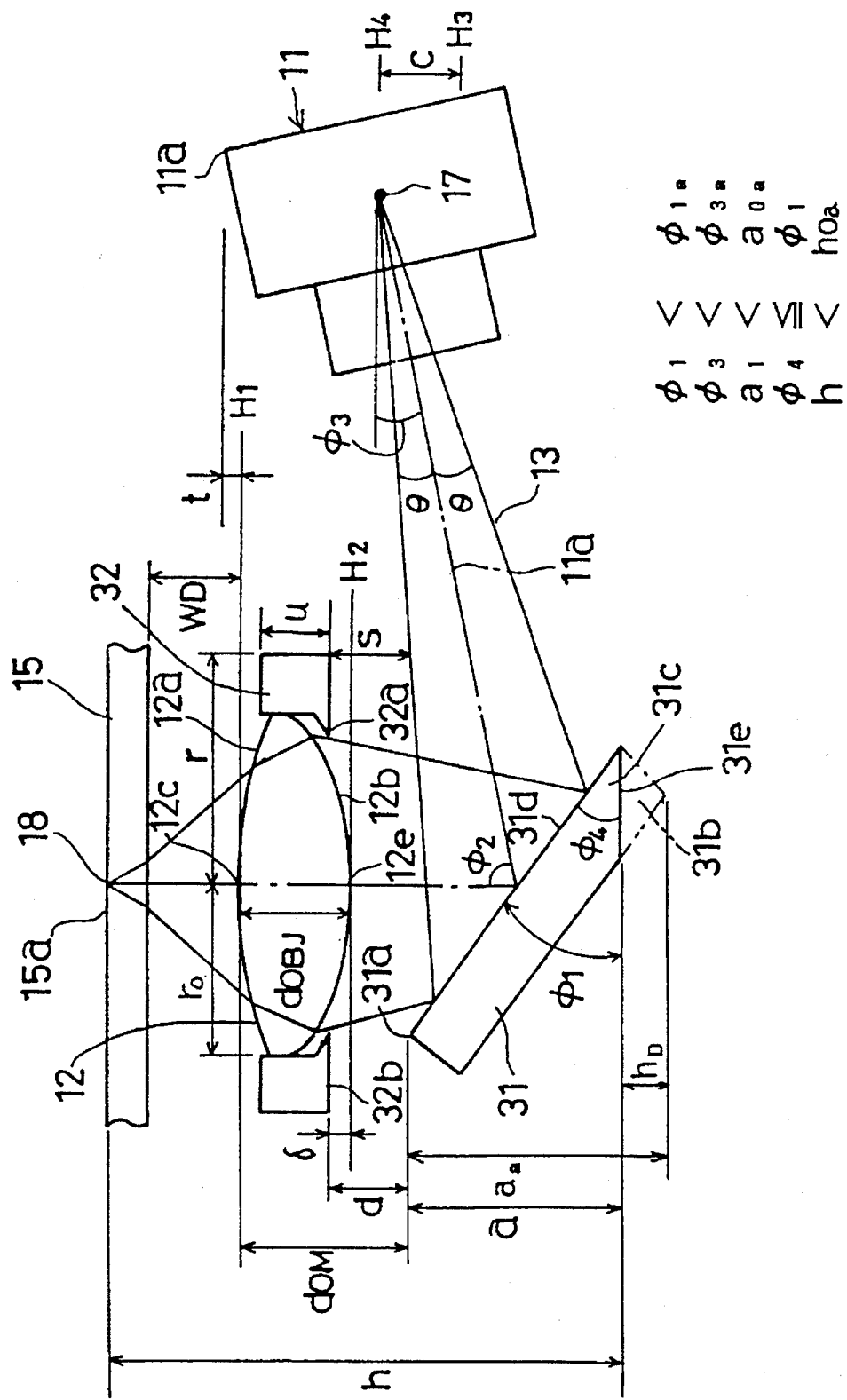
FIG. 4 shows an arrangement of the optical pickup device in a first embodiment of the present invention.

FIG. 4 shows an optical pickup device 30 in a first embodiment of the present invention. Reference numerals of components shown in FIG. 2 are also used for corresponding components shown in FIG. 4 and description thereof are omitted.

The optical pickup device 30 has the light emitting unit (hologram unit) 11, limited-distance objective lens 12, stand-up mirror 31 and objective-lens holder 32 having the aperture stop 32a. Four methods are used in the optical pickup device 30 for achieving a reduced height device without causing partial eclipse of the light beams.

A first method will now be described. The aperture stop 32a is located so that the bottom edge thereof is located at a level higher than the level $H_2$ of the bottom portion 12e of the objective lens 12. The aperture stop 32a is located at the bottom surface 32b of the objective-lens holder 32. The objective-lens holder 32 has a thickness 'u' which is less than the thickness '$u_a$' of the objective-lens holder 21 shown in FIG. 2. Thereby, the aperture stop 32a or the bottom surface 32b of the objective-lens holder 32 is located at a level higher by a distance δ than the level $H_2$ of the bottom portion 12e of the lens 12 as shown in FIG. 4.

How much the distance between the objective lens 12 and the stand-up mirror 81 can be reduced as a result of the aperture stop 32a being raised above the level $H_2$ will now be described.

In FIGS. 2 and 4, as shown in the figures, the distances between the aperture openings 21a, 32a and the top edges 14a, 31a of the stand-up mirrors 14, 31 are represented by 'd'; the distances between the bottom portion 1ee of the objective lens 12 and the aperture openings 21a, S2a are represented by '$δ_a$' and 'δ'; the maximum vertical thickness of the objective lens 12 is represented by '$d_{OBJ}$'; and the distances between the top portion 12c of the objective lens 12 and the top edges 14a, 31a of the stand-up mirrors 14, 31 are represented by '$d_{OMa}$' and '$d_{OM}$'.

In the optical pickup device 30 shown in FIG. 4, $d_{OM}$ is calculated by the following equation (1):

$$d_{OM} = d_{OBJ} d - δ \qquad (1)$$

In the optical pickup device 20 shown in FIG. 2, $d_{OMa}$ is calculated by the following equation (2):

$$d_{OMa} = d_{OBJ} + d + \delta_a \quad (2)$$

As a result, a difference between $d_{OMa}$ and $d_{OM}$ is obtained by the following equation (3):

$$d_{OMa} - d_{OM} = \delta_a + \delta \quad (3)$$

Thus, the distance between the objective lens 12 and the stand-up mirror 31 in the optical pickup device 30 shown in FIG. 4 is shorter by $\delta_a + \delta$ than that in the optical pickup device 20 shown in FIG. 2. Thus, the optical pickup device 30 has a thinner or reduced external height than that of the optical pickup device 20.

As a result of raising the aperture opening 32a with respect to the objective lens 12 as described above, the convex bottom surface 12b of the lens 12 projects from the bottom surface 32b of the objective-lens holder 32 by $\delta$ as shown in FIG. 4. However, the downward-convex curvature of the convex bottom surface 12b can prevent the convex bottom surface 32b from coming into contact with the stand-up mirror 31 when the objective lens 12 is lowered in the focusing control operation.

Thus, by positioning the aperture stop at a higher position, it is possible to position the stand-up mirror at a position close to the objective lens. As a result, it is possible to reduce the thickness of the optical pickup device.

A second method will now be described. The light emitting unit 11 is located so that the top edge 11a is located higher by a projection distance 't' than the level $H_1$ of the top portion of the objective lens 12 as shown in FIG. 4. A working distance WD is provided between the optical disc 15 and the top portion 12c of the object lens 12 such that the objective lens 12 can move in the focusing control operation. Further, a value 'Dr' is predetermined according to standards, in which range 'Dr' the height of the optical disc 15 may vary due to vibration thereof which may occur when the disc is rotated or the like. The above-mentioned projection distance 't' is predetermined so that a condition is expressed by the following inequality (4):

$$0 \leq t \leq WD - Dv \quad (4)$$

As a result, the optical disc 15 is prevented from coming into contact with the top edge 11a of the light emitting unit 11. Although it is omitted in the figures, actually, the optical disc 15 further may extend horizontally and thus may be present above the light emitting unit 11.

By positioning the light emitting unit 11 at a position near the highest one within the condition of the inequality (4), the level $H_4$ of the light emitting unit 11 in the arrangement shown in FIG. 4 is higher by a distance 'c' than the level $H_3$ thereof in the arrangement shown in FIG. 2. As a result, the light emitting unit 11 is further inclined and thus the light axis 11a of the light emitting unit 11 is downwardly inclined from the horizontal direction $\phi_3$ larger than $\phi_{3a}$ in the arrangement shown in FIG. 2. As a result, it is possible to reduce the stand-up angle $\phi_1$ of the stand-up mirror 31 to a value smaller than the stand-up angle $\phi_{1a}$ of the stand-up mirror 14 in the arrangement shown in FIG. 2. This is because an equation $\phi_2 = 2\phi_{1a}$ is substantially the same as the above-mentioned equation $\phi_{2a} = 2\phi_{1a}$ and because $\phi_2$ is reduced accordingly as $\phi_3$ is increased.

As the stand-up angle $\phi_1$ is reduced, the height '$a_a$' of the stand-up mirror 31 is reduced accordingly to be a value smaller than the height $a_{0a}$ of the stand-up mirror 14 in the arrangement shown in FIG. 2. Thus, the optical pickup device 30 has a thinner or reduced external height than that of the optical pickup device 20.

The projection distance 't' is determined by the following equation (5):

$$t = t(\phi_1) = \quad (5)$$
$$(1 + \cos 2\phi_1) \cdot l(\phi_1) - (d_{LD} + l_{OL}) \cdot \cos 2\phi_1 + h_{LD} \cdot \sin 2\phi_1 + d_{OBJ};$$
where $$l(\phi_1) = \frac{\{l_{OL} \cdot \sin\theta + b \cdot \cos(\theta + \phi_1)\} \cdot \sin\phi_1}{\sin\theta \cdot \cos\phi_1 + \cos(\phi_1 + \theta)} + \quad (6)$$
$$\frac{(d - \delta) \cdot \cos(\theta + \phi_1)}{\sin\theta \cdot \cos\phi_1 + \cos(\phi_1 + \theta)}$$

and

'$l_{OL}$' indicates the distance along the light path between the bottom end 1ee of the objective lens 12 and the object point 17;

'$d_{OBJ}$' indicates the thickness of the objective lens;

'$d_{LD}$' indicates the thickness between the object point and the bottom surface in the light emitting unit;

'$h_{LD}$' indicates ½ the height of the light emitting unit;

'd' indicates the distance between the aperture stop bottom surface and the top edge of the stand-up mirror;

'$\delta$' indicates the distance between the aperture stop bottom surface and the bottom edge of the objective lens;

'b' indicates a margin in the stand-up mirror for beam diameter; and

'$\theta$' indicates the divergence angle of the light beams (laser beams) 13.

Thus, by using the second method that the light emitting unit is located at a higher position, it is possible to reduce the stand-up angle of the stand-up mirror. As a result, the height dimension of the stand-up mirror can be reduced and thus the thickness of the optical pickup device can be reduced accordingly.

A third method will now be described. The radius 'r' of the objective-lens holder 32 is predetermined in conditions that $r_0 < r$ and $d \leq S$, where, as shown in FIG. 4, '$r_0$' indicates the radius of the objective lens 12; 'd' indicates the distance between the aperture stop 32a and the top edge of the stand-up mirror 31; and 'S' indicates the distance between the aperture stop 32a and the top one of the light beams 13 emitted from the light emitting unit 11 and then incident on the stand-up mirror 31.

'S' is the following function (7) of 'r':

$$S = \frac{r}{\tan(2\phi_1 + \theta)} + \{l_{OL} - l(\phi_1)\} \left\{ \cos 2\phi_1 \frac{\sin 2\phi_1}{\tan(2\phi_1 + \theta)} \right\}; \quad (7)$$

where, as mentioned above, '$l_{OL}$' indicates the distance along the light path between the bottom end 12e of the objective lens 12 and the object point; and '$\theta$' indicates the divergence angle of the light beams (laser beams) 13.

As a result of positioning the light emitting unit 11 at the higher level $H_4$ in the further inclined condition according to the second method as shown in FIG. 4, the above-mentioned distance 'S' is reduced. Therefore, it is likely that the above-mentioned partial eclipse of the light beams may occur when the objective-lens holder 32 is lowered in the focusing control operation. However, by predetermining the radius 'r' of the objective-lens holder 32 as described above, even when the objective-lens holder 32 is lowered to the limit in the focusing control operation, the light beams 13 are prevented from being eclipsed by the objective-lens holder 32.

A fourth method will now be described. The bottom of the stand-up mirror 31 is formed to be wedged-shaped as shown in FIG. 4. A bottom edge portion 31b, indicated by a chain double-dashed line in FIG. 4, of the stand-up mirror 31 is cut along a substantially horizontal plane as shown in the figure and thus a wedged-shaped portion 31c is formed. An angle $\phi_4$ formed between a mirror surface 31d and a bottom surface 31e at the wedged-shaped portion 31c of the stand-up mirror 31 is predetermined to be equal to or less than the stand-up angle $\phi_1$. Thus, the height 'a' of the stand-up mirror 31 is reduced, by a height '$h_D$' shown in the figure, from the above-mentioned height '$a_a$' in a case where the bottom edge portion 31b is not cut. Thus, the optical pickup device 30 has a thinner or reduced external height than that of the optical pickup device 20. Thus, by eliminating a portion, of the stand-up mirror, which is lower than the bottom edge of the mirror surface, it is possible to reduce the thickness of the optical pickup device.

The amount of thickness reduction of the optical pickup device 30 shown in FIG. 4, using the first, second, third and fourth methods, with respect to the optical pickup device 20 in the related art shown in FIG. 2 will now be described. In the description, actual dimensional values, for example, are applied to the optical pickup devices using optical components which are generally conventionally used.

In the device 20 in the related art shown in FIG. 2:

the above-mentioned objective lens working distance WD=1.66 mm;

the objective lens thickness $d_{OBJ}$=2.35 mm;

the distance between the bottom end of the objective lens and the object point in the hologram unit $1_{OL}$=19.111 mm;

the laser beam divergence angle θ=4.69°;

the objective lens working distance in the focusing control operation d=1.0 mm;

the distance between the objective lens bottom end and the lens holder aperture stop $\delta_a$=0.5 mm;

the stand-up mirror thickness=1.0 mm;

the margin in the stand-up mirror for the beam diameter b=0.5 mm; and the lens holder outer diameter=7.4 mm.

In these conditions, the minimum angle $\phi_{1amin}$ of the stand-up angle $\phi_{1a}$ of the stand-up mirror 14 where no eclipse of the light beams by the lens holder occurs, when the objective lens is lowered to the limit in the focusing control operation is calculated. The result $\phi_{1amin}$=40.83°. This angle is the limit to which the stand-up mirror 14 can be inclined in the horizontal direction in the arrangement shown in FIG. 2. This angle varies depending on the dimensions of the objective lens. If the larger objective lens is used, the above-mentioned limit is enlarged. If the smaller objective lens is used, the above-mentioned limit is reduced.

In contrast to this, in the device 30 using the same objective lens in the first embodiment shown in FIG. 4:

the objective lens working distance WD=1.66 mm;

the objective lens thickness $d_{OBJ}$=2.35 mm;

the distance between the bottom end of the objective lens and the object point in the hologram unit $1_{OL}$=19.111 mm;

the laser beam divergence angle θ=4.69°;

the objective lens working distance in the focusing control operation d=1.0 mm;

the distance between the objective lens bottom end and the lens holder aperture stop δ=0.1 mm;

the stand-up mirror thickness=1.0 mm;

the margin in the stand-up mirror for the beam diameter b=0.5 mm; and the lens holder outer diameter=6.4 mm.

In these conditions, the minimum angle $\phi_{1min}$ of the stand-up angle $\phi_1$ of the stand-up mirror 14 where no eclipse of the light beams by the lens holder occurs when the objective lens is lowered to the limit in the focusing control operation is calculated. The result is $\phi_{1min}$=40.66°. Thus, the minimum angle of the stand-up angle of the stand-up mirror can be reduced 0.17° in comparison to the arrangement shown in FIG. 2.

Then, the height '$h_{Oa}$' of the optical pickup device 20 shown in FIG. 2 between the label surface (top surface) of the disc 15 and the bottom edge of the stand-up mirror 14 is calculated in accordance with the above-mentioned conditions. The result is $h_{Oa}$=9.61 mm. In contrast to this, the height 'h' of the optical pickup device 30 shown in FIG. 4, based on the above-mentioned reduction $h_D$ is calculated. The result h=7.92 mm. Thus, the height of the device can be reduced by 1.69 mm in the first embodiment in comparison to the arrangement in the related art.

Other embodiments of the present invention will now be described with reference to FIGS. 5 through 9. Reference numerals same as those of components shown in FIG. 4 are used for corresponding components.

Figure 5:
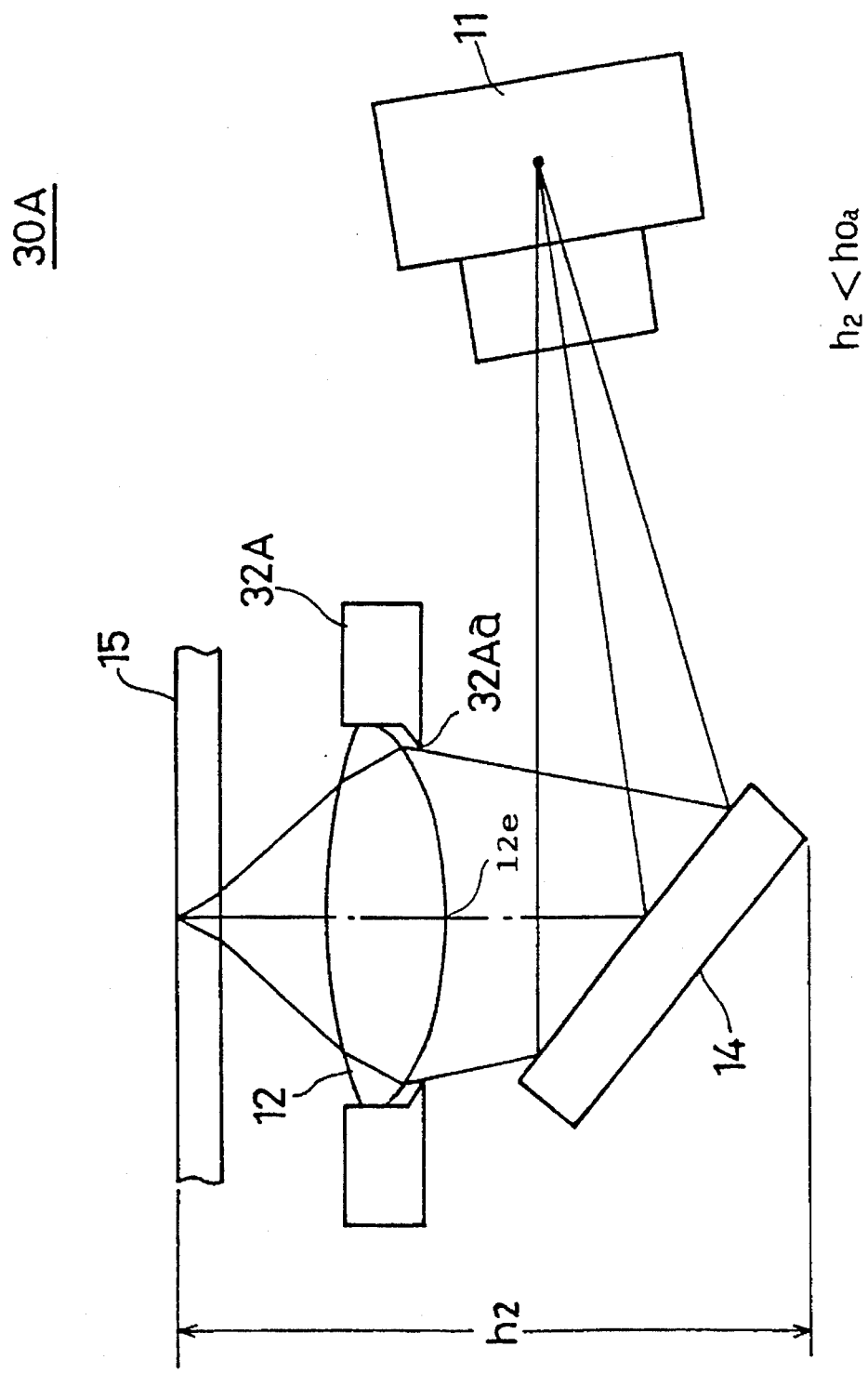
FIG. 5 shows an arrangement of the optical pickup device in a second embodiment of the present invention.

FIG. 5 shows an optical pickup device 30A in a second embodiment of the present invention. This optical pickup device BOA uses only the first method of the above-described first, second, third and fourth methods which the optical pickup device 30 in the first embodiment uses. Specifically, in the device 30A, the aperture stop 32Aa is positioned so that the bottom edge thereof is located higher than the level of the bottom portion lee of the objective lens 12. The objective-lens holder 32A has a thickness which is less than the thickness '$u_a$' of the objective-lens holder 21 shown in FIG. 2. Thereby, the aperture stop 32Aa of the objective-lens holder 32A is positioned at a level higher than the level of the bottom portion 12e of the lens 12. As a result, by the same reason as that described above with reference to the equations (1), (2) and (3), the height $h_2$ of the device 30A can be less than the height $h_{Oa}$ of the device 20 in the related art shown in FIG. 2.

Figure 6:
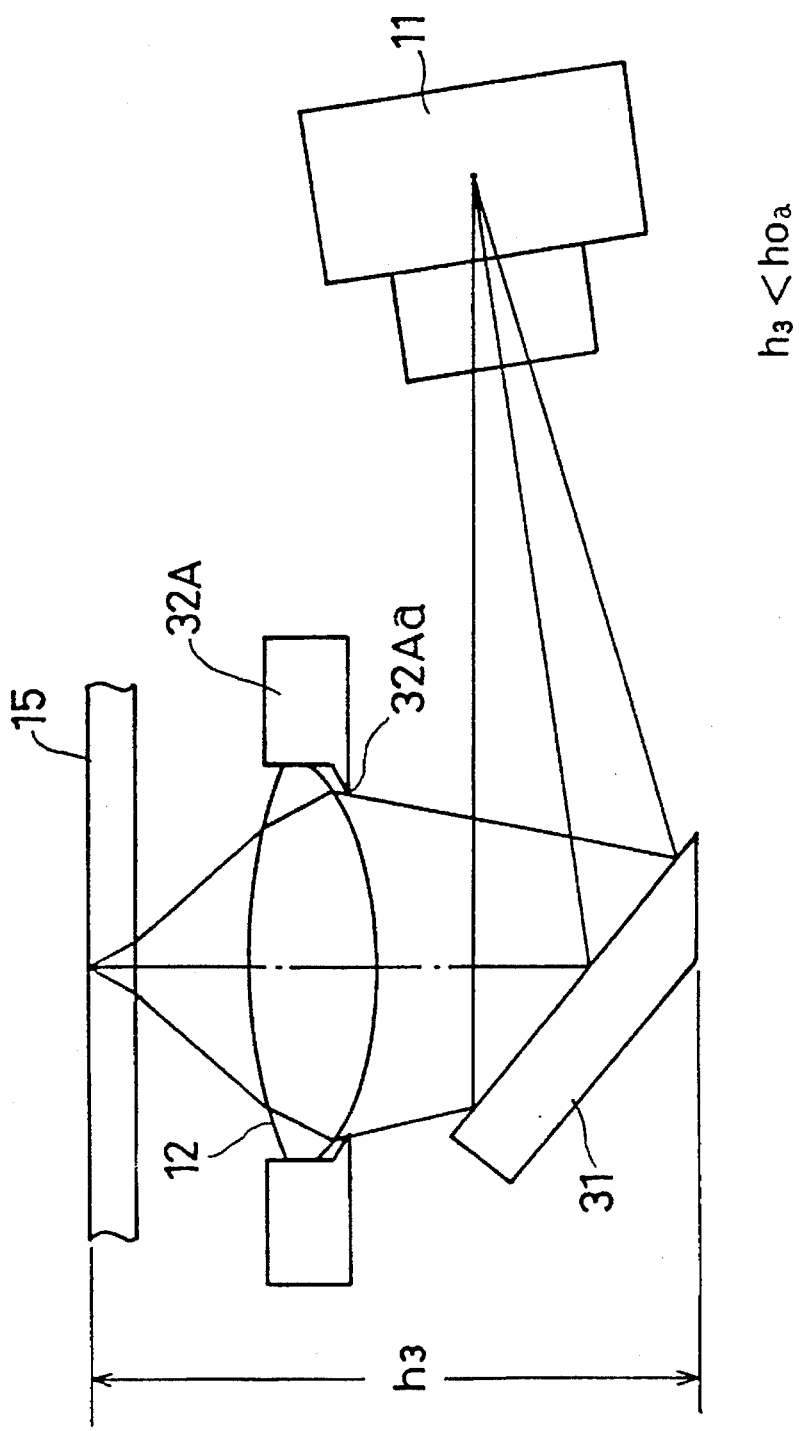
FIG. 6 shows an arrangement of the optical pickup device in a third embodiment of the present invention.

FIG. 6 shows an optical pickup device 30B in a third embodiment of the present invention. This optical pickup device 30B uses only the first and fourth methods of the above-described first, second, third and fourth methods which the optical pickup device 30 in the first embodiment uses. Specifically, in the device 30C, the aperture stop 32Aa is positioned so that the bottom edge thereof is located at a level higher than the level of the bottom portion 12e of the objective lens 12, in the same manner as the aperture stop in the device 30A shown in FIG. 5. Further, the bottom edge portion is cut along the horizontal plane from the stand-up mirror 31 and thus the wedge-shaped portion is formed. As a result, the height $h_3$ of the device 30B can be further reduced compared to the height $h_{Oa}$ of the device 20 in the related art shown in FIG. 2.

Figure 7:
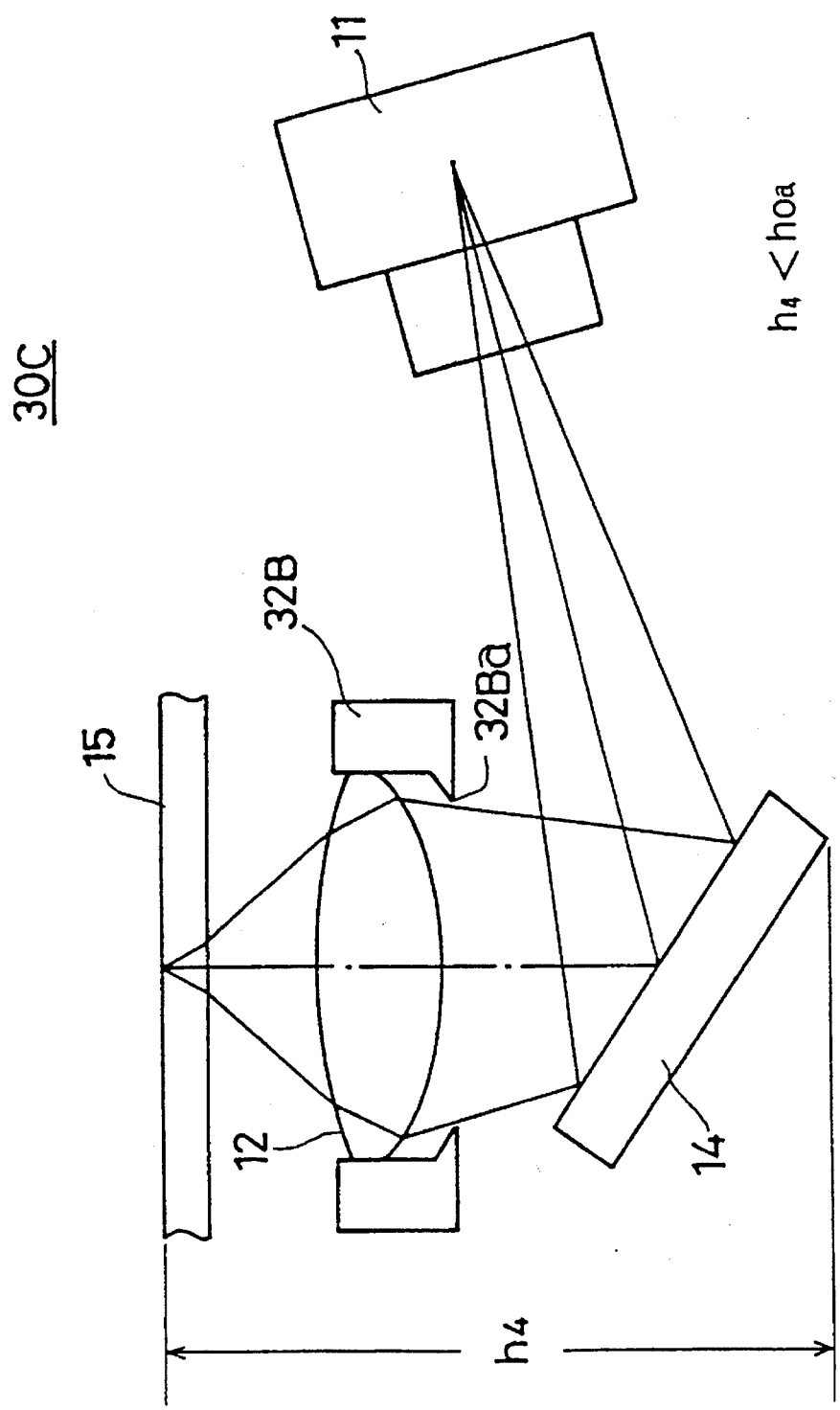
FIG. 7 shows an arrangement of the optical pickup device in a fourth embodiment of the present invention.

FIG. 7 shows an optical pickup device 30C in a fourth embodiment of the present invention. This optical pickup device 30C uses only the second and third methods of the above-described first, second, third and fourth methods which the optical pickup device 30 in the first embodiment uses. Specifically, in the device 30C, the light emitting unit 11 is located at the higher level position and also the radius 'r' of the objective-lens holder 32B is predetermined by the conditions that $r_0 < r$ and $d \leq S$, similar to the case of the third method as described above in the first embodiment. As a result, the height $h_4$ of the device 30C can be less than the height $h_{Oa}$ of the device 20 in the related art shown in FIG. 2.

Figure 8:
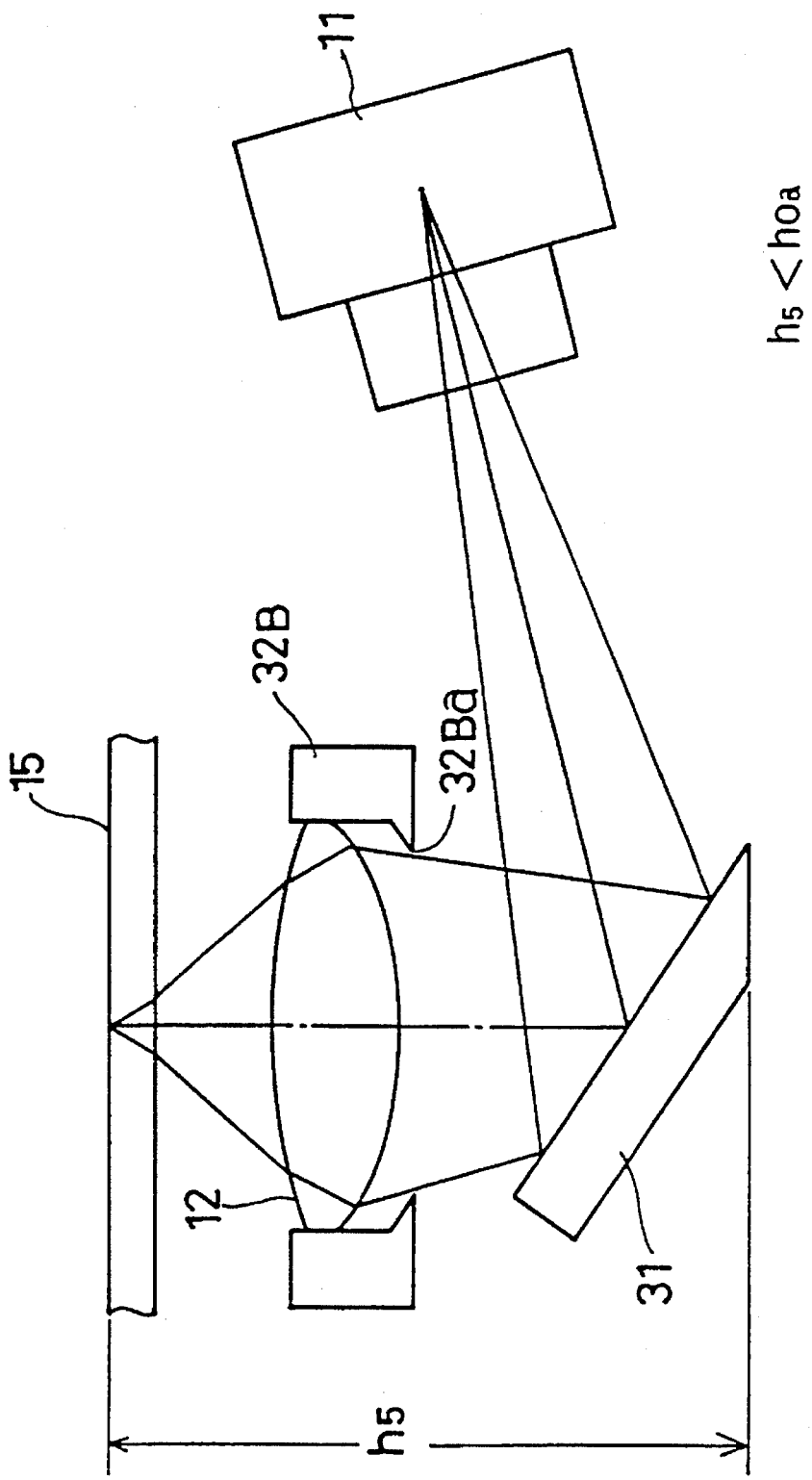
FIG. 8 shows an arrangement of the optical pickup device in a fifth embodiment of the present invention.

FIG. 8 shows an optical pickup device 30D in a fifth embodiment of the present invention. This optical pickup device 30D uses only the second, third and fourth methods of the above-described first, second, third and fourth methods which the optical pickup device 30 in the first embodiment uses. Specifically, in the device 30D, the light emitting unit 11 is located at the higher level position and also the radius 'r' of the objective-lens holder 32B is predetermined by the conditions that $r_0 < r$ and $d \leq S$, similar to the case of using the third method as described above in the first embodiment. Further, the bottom edge portion is cut along the horizontal plane from the stand-up mirror 31 and thus the wedge-shaped portion is formed. As a result, the height $h_5$ of the device 30D can be further reduced compared to the height $h_{0a}$ of the device 20 in the related art shown in FIG. 2.

FIG. 9 shows an optical pickup device 30E in a sixth embodiment of the present invention. This optical pickup device 30E uses only the first, second and third methods of the above-described first, second, third and fourth methods which the optical pickup device 30 in the first embodiment uses. Specifically, in the device 30E, by reducing the thickness of the lens holder 32, the aperture stop 32a is positioned so that the bottom edge thereof is located at a level higher than the level of the bottom portion 12e of the objective lens 12. Further, the light emitting unit 11 is located at the higher level position and also the radius 'r' of the objective-lens holder 32 is predetermined by the conditions that $r_0 < r$ and $d \leq S$, similar to the case of the third method as described above in the first embodiment. As a result, the height $h_6$ of the device 30E can be less than the height $h_{0a}$ of the device 20 in the related art shown in FIG. 2.

Further, the present invention is not limited to the above described embodiments, and variations and modifications may be made without departing from the scope of the present invention.

What is claimed is:

1. An optical pickup unit comprising:

a light emitting unit for emitting a light beam in a direction downwardly oblique from a horizontal direction;

a single stand-up mirror for reflecting said light beam so as to deflect said light beam upwardly, a stand-up angle of said stand-up mirror being not more than 45°;

an objective lens for converging a deflected light beam onto an information recording medium;

a lens holder for holding said objective lens; and an aperture stop provided in said lens holder for limiting a light beam which is then incident on said objective lens, said aperture stop being located at a level higher than a projecting end of a bottom convex surface of said objective lens.

2. The optical pickup unit according to claim 1, wherein a top end of said light emitting unit is located at a level higher than a projecting end of a top convex surface of said objective lens; and said lens holder has a shape such that said lens holder is prevented from obstructing a light path along which said light beam emitted by said light emitting unit and then incident on said stand-up mirror passes.

3. An optical pickup unit comprising:

a light emitting unit for emitting a light beam in a direction downwardly oblique from a horizontal direction;

a single stand-up mirror for reflecting said light beam so as to deflect said light beam upwardly, a reflection angle of said light beam by said stand-up mirror being more than 90°;

an objective lens for converging a deflected light beam onto an information recording medium;

a lens holder for holding said objective lens; and an aperture stop provided in said lens holder for limiting a light beam which is incident on said objective lens;

wherein a top end of said light emitting unit is located at a level higher than a projecting end of a top convex surface of said objective lens, and said lens holder has a shape such that said lens holder is prevented from obstructing a light path along which said light beam emitted by said light emitting unit and then incident on said stand-up mirror passes.

4. The optical pickup unit according to claim 1, wherein a portion of said stand-up mirror, which would otherwise extend further than a bottom end of a mirror surface of said stand-up mirror, is removed from said stand-up mirror.

5. The optical pickup unit according to claim 2, wherein a portion of said stand-up mirror, which would otherwise extend further than a bottom end of a mirror surface of said stand-up mirror, is removed from said stand-up mirror.

6. The optical pickup unit according to claim 3, wherein a portion of said stand-up mirror, which would otherwise extend further than a bottom end of the mirror surface of said stand-up mirror, is removed from said stand-up mirror.

7. The optical pickup unit according to claim 1, wherein the radius of said lens holder is larger than the radius of said objective lens; and a distance between said aperture stop and a top end of the light beam, which is emitted from said light emitting unit toward said stand-up mirror, is equal to or larger than a distance between said aperture stop and a top end of said stand-up mirror.

8. The optical pickup unit according to claim 2, wherein the radius of said lens holder is larger than the radius of said objective lens; and a distance between said aperture stop and a top end of the light beam, which is emitted from said light emitting unit toward said stand-up mirror, is equal to or larger than a distance between said aperture stop and a top end of said stand-up mirror.

* * * * *